United States Patent Office 3,292,521
Patented Dec. 20, 1966

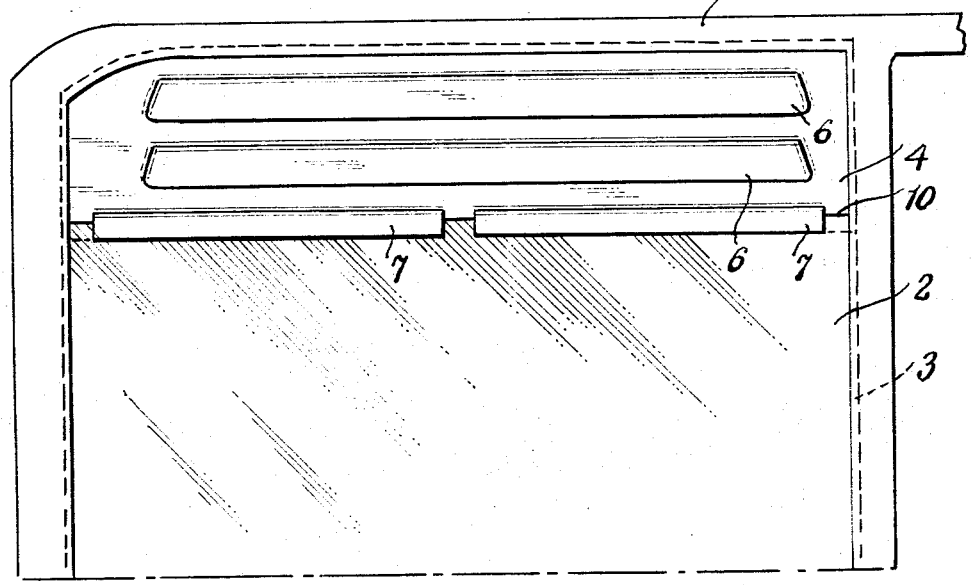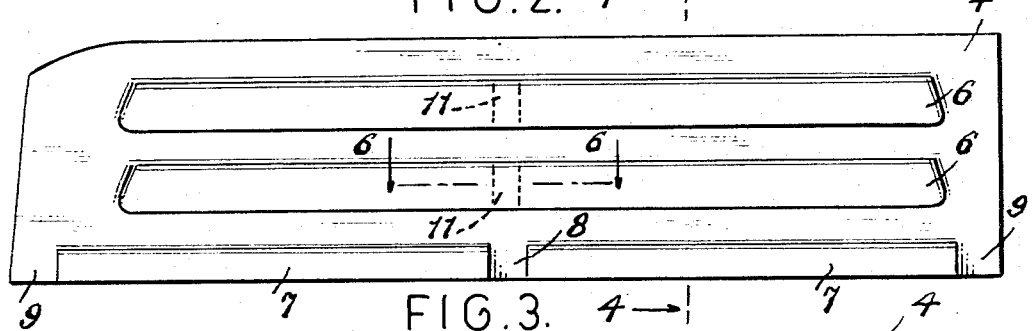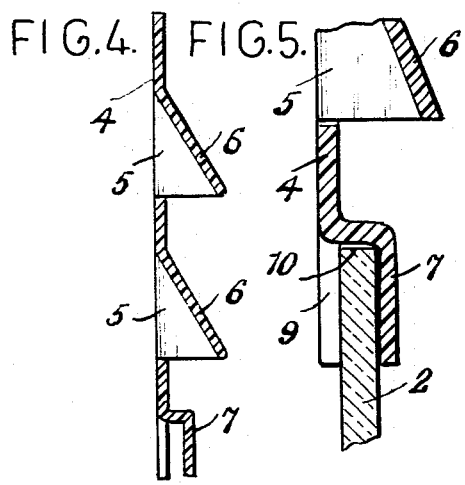

3,292,521
VENTILATORS FOR AUTOMOBILE WINDOWS
Reginald C. Requa, 700 N. Riverside Drive,
Pompano Beach, Fla.
Filed Dec. 30, 1964, Ser. No. 422,269
1 Claim. (Cl. 98—2)

This invention relates to ventilators and more particularly to a type especially adapted for use in automobiles or other vehicles.

In automobiles it is often found desirable for ventilating purposes, to keep one or more of the windows open. This is often done when the car is parked in the sun and for the purpose of allowing the heated air within the car to escape. When a window of the car is left slightly open rain or snow can possibly enter into the car. In addition the open window subjects the car to the possibility of theft since an implement might be inserted through the open window and the door lock manipulated to thus open the door of the car. Moreover, it is often found desirable to have one of the windows of the car slightly open whenever the car is occupied or is in motion. However, an open or partly open window creates drafts found uncomfortable to the car occupants.

It is therefore an object of the present invention to provide a louvered, transparent ventilating panel which can be removably inserted in a car window frame and positioned between the top of a slightly opened window pane and the upper part of the window frame to thereby fill the space between the top of the pane and the frame, thus producing the effect of a fully closed window, while at the same time providing louvered ventilating slots through which air may pass to ventilate the interior of the car, and without causing a draft. The panel, while providing ventilation as above stated, will prevent the entry of rain or snow into the car.

More particularly, the invention contemplates the provision of a transparent plastic sheet or panel having one or more louvered slots or ventilating openings, the panel being provided at its lower end with means by which it engages the top edge portion of a partly-open window pane. The panel thus provided is of a shape to fit in and close the space in the window frame between the top of the window pane and the top of the window frame, so that the opening defined by the window frame is thus completely closed by the combination of the partly-open pane and the ventilating panel fitted thereon.

With these and other objects to be hereinafter set forth in view, I have devised the arrangement of parts to be described and more particularly pointed out in the claim appended hereto.

In the accompanying drawing, wherein an illustrative embodiment of the invention is disclosed, FIG. 1 is an elevational view of a part of a car window, showing the improved ventilating panel fitted in position therein;

FIG. 2 is a face view of the panel as seen from the outer side of the same;

FIG. 3 is a top plan view of the panel;

FIG. 4 is a sectional view, taken substantially on the line 4—4 of FIG. 2, looking in the direction of the arrows;

FIG. 5 is a sectional view of a part of the lower end of the panel showing how the same engages with the upper edge portion of the window pane or glass;

FIG. 6 is a sectional view, taken substantially on the line 6—6 of FIG. 2, looking in the direction of the arrows.

Referring to the drawing, 1 indicates the frame of a window of an automobile or other vehicle, and which may be a front or rear window thereof. The frame contains the conventional window pane 2 which can be raised or lowered within the frame by the usual operating mechanism. In such raising and lowering, the pane moves in the groove 3 provided in the frame.

The improved ventilating panel consists of a stiff sheet panel-like in form, composed of a transparent plastic material such as that known as "Plexiglas" or other material of similar characteristics. This panel is of a shape to enable it to fit between the top edge portion 10 of the partially raised window pane 2 and the top of the window frame to thereby close said space, as clearly seen in FIG. 1. The shape of the window frame differs in various makes of cars and hence the panel 4, while herein shown in a certain shape, may be shaped otherwise to fit any car.

The panel 4 is provided with a plurality of ventilating openings 5 which may be in the form of elongated horizontal slots. There may be one or more of these ventilating openings and they may, if desired be shaped otherwise than shown. Each of the slots is formed with a hood or is louvered as shown at 6, the louvers being preferably integrally formed with the body of the panel. The number and shape of these louvers may be varied.

Means is provided at the lower end of the panel for engaging the panel with the upper portion of the partly-raised window pane 2, and such means consists of off-set flanges 7 formed by splitting or bifurcating the lower end of the panel. Said flanges 7 fit over the top of the window pane as clearly shown in FIG. 5, and co-operate with the lower parts 8 and 9 of the body of the panel in straddling the top of the pane.

From the foregoing, the uses and advantages of the improved ventilating panel will be apparent. The same is fitted on the top of the pane 2 and the pane is partly-raised to confine the panel 4 between its upper end and the groove 6 in the top part of the frame. The panel 4, being transparent, does not impair visibility. It is composed of one piece of material and is easily manufactured and economically sold. It is shatterproof and can be fitted in place and removed without the use of tools, and its louvered ventilating openings will provide ventilation without permitting the entry of rain or snow into the car. It also avoids the dangers of theft present when a window is left open in an unguarded car.

For adding rigidity and stiffness to the louvers 6, the same may, if desired, be partitioned as shown at 11.

Having thus described a single embodiment of the invention, it is obvious that the same is not to be restricted thereto, but is broad enough to cover all structures coming within the scope of the annexed claim.

What I claim is:

A ventilating device for an automobile window frame comprising, a panel composed of a transparent plastic material and shaped to fit in the groove of the window frame of a car and close any space between the top of a partially raised window pane in the frame and the top of the frame, the panel being composed of a material which permits its slight flexure if necessary to fit the curvature of the frame, the panel being of single piece construction and being unreinforced at its edges, the panel being provided with a plurality of longitudinally-extending louvered slots extending for the length of the panel, vertical partitions located within the louvers for stiffening the same, the panel being bifurcated at its lower end to provide two flanges between which the upper edge of the window pane fits, one of the flanges being in the plane of the body of the panel and the other flange being off-set therefrom.

References Cited by the Examiner

UNITED STATES PATENTS

| | | | |
|---|---|---|---|
| 2,638,833 | 5/1953 | Snyder | 98—2.2 |
| 2,641,501 | 6/1953 | Ensey | 98—2.2 X |
| 2,919,638 | 1/1960 | Matthews | 98—2.2 |
| 2,949,842 | 8/1960 | Crandall | 98—2.2 |
| 3,083,630 | 4/1963 | Thaxton | 98—2.2 |

MEYER PERLIN, *Primary Examiner.*